United States Patent
Nakai et al.

(10) Patent No.: US 8,980,473 B2
(45) Date of Patent: Mar. 17, 2015

(54) ANODE AND BATTERY (75) Inventors: Hideki Nakai, Fukushima (JP); Akinori Kita, Fukushima (JP); Atsumichi Kawashima, Fukushima (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 1885 days.

(21) Appl. No.: 11/270,099

(22) Filed: Nov. 9, 2005

(65) Prior Publication Data
US 2006/0099512 A1    May 11, 2006

(30) Foreign Application Priority Data

Nov. 10, 2004 (JP) ................ P2004-327006

(51) Int. Cl.
| | |
|---|---|
| H01M 4/13 | (2010.01) |
| H01M 4/58 | (2010.01) |
| H01M 4/134 | (2010.01) |
| H01M 4/36 | (2006.01) |
| H01M 4/38 | (2006.01) |
| H01M 4/62 | (2006.01) |
| H01M 10/052 | (2010.01) |
| H01M 4/131 | (2010.01) |
| H01M 4/1395 | (2010.01) |
| H01M 4/40 | (2006.01) |
| H01M 4/505 | (2010.01) |
| H01M 4/525 | (2010.01) |
| H01M 10/0587 | (2010.01) |
| H01M 4/02 | (2006.01) |

(52) U.S. Cl.
CPC .............. *H01M 4/134* (2013.01); *H01M 4/364* (2013.01); *H01M 4/366* (2013.01); *H01M 4/38* (2013.01); *H01M 4/382* (2013.01); *H01M 4/62* (2013.01); *H01M 10/052* (2013.01); *H01M 4/131* (2013.01); *H01M 4/1395* (2013.01); *H01M 4/405* (2013.01); *H01M 4/505* (2013.01); *H01M 4/525* (2013.01); *H01M 4/5825* (2013.01); *H01M 10/0587* (2013.01); *H01M 2004/027* (2013.01); *Y02E 60/122* (2013.01)
USPC ........................................ 429/212; 429/218.1

(58) Field of Classification Search
CPC ........ H01M 4/366; H01M 4/405; H01M 4/62
USPC ...................................... 429/212, 217, 218.1
See application file for complete search history.

(56) References Cited

U.S. PATENT DOCUMENTS

| | | | |
|---|---|---|---|
| 6,171,725 B1 * | 1/2001 | Suzuki et al. .............. | 429/218.1 |
| 6,949,312 B1 | 9/2005 | Kawakami et al. | |
| 2002/0009646 A1 * | 1/2002 | Matsubara et al. ........ | 429/231.8 |
| 2003/0088971 A1 * | 5/2003 | Visco et al. ................ | 29/623.1 |
| 2003/0180626 A1 * | 9/2003 | Shima et al. ................ | 429/326 |
| 2004/0058246 A1 * | 3/2004 | Choi et al. .................... | 429/232 |

FOREIGN PATENT DOCUMENTS

JP    2000/311681    11/2000

* cited by examiner

*Primary Examiner* — Helen O Conley
(74) *Attorney, Agent, or Firm* — K&L Gates LLP (57) ABSTRACT

An anode and a battery capable of improving battery characteristics such as cycle characteristics are provided. A coating containing at least one from the group consisting of oligomers having a polyene structure and derivatives thereof is provided on the surface of an anode active material layer. The anode active material layer contains a substance containing Si or Sn as an element as an anode active material. By the coating, oxidation of the anode active material layer is inhibited, and decomposition reaction of the electrolytic solution is inhibited.

18 Claims, 7 Drawing Sheets

ANODE AND BATTERY

CROSS REFERENCES TO RELATED APPLICATIONS

The present application claims priority to Japanese Patent Application JP 2004-327006 filed in the Japanese Patent Office on Nov. 10, 2004, the entire contents of which is being incorporated herein by reference.

BACKGROUND

The present invention relates to an anode and a battery using it, particularly to an anode effective in the case that the anode has an anode active material layer which is capable of inserting and extracting an electrode reactant and contains a metal element or a metalloid element as an element, and a battery using it.

As electronic technology has been advanced in recent years, portable electronic devices such as a combination camera, a mobile phone, and a laptop personal computer have been developed. Accordingly, as a power source for such electronic devices, development of small and light secondary batteries having a high energy density has been strongly demanded.

As a secondary battery meeting such a demand, a secondary battery using a light metal such as lithium (Li), sodium (Na), and aluminum (Al) as an anode active material is promising. According to such a secondary battery, a high voltage can be theoretically generated, and a high energy density can be obtained. Specially, since the secondary battery using a lithium metal as an anode active material can provide a higher output and a higher energy density, research and development thereof has been actively implemented.

However, when a light metal such as a lithium metal is used as an anode active material as it is, dendrite crystal of the light metal is easily precipitated on the anode in the process of charge and discharge. When the dendrite crystal is precipitated, the current density of the end thereof becomes very high, and therefore an electrolytic solution is easily decomposed and cycle characteristics are lowered. Further, when the dendrite crystal reaches the cathode, internal short circuit occurs.

Therefore, in order to prevent such precipitation of dendrite crystal, a secondary battery, not using a lithium metal as an anode active material as it is, but using an anode material capable of inserting and extracting lithium ions has been developed.

As such an anode material, carbon materials have been widely used traditionally. In recent years, in order to obtain a higher capacity, using silicon (Si), tin (Sn), or an alloy thereof has been considered (for example, refer to Japanese Unexamined Patent Application Publication No. 2000-311681).

However, there has been a disadvantage that in the anode material using silicon, or tin as above, cycle characteristics are lower than in the carbon materials, and it is difficult to take advantage of the feature, the high capacity.

SUMMARY

In view of the foregoing, in the present invention, it is desirable to provide a battery capable of improving battery characteristics such as cycle characteristics.

According to an embodiment of the present invention, there is provided an anode which has a coating containing at least one from the group consisting of oligomers having a polyene structure and derivatives thereof.

According to an embodiment of the present invention, there is provided a battery including a cathode, an anode, and an electrolyte, in which the anode has a coating containing at least one from the group consisting of oligomers having a polyene structure and derivatives thereof.

According to the embodiment of the present invention, the anode has the coating containing at least one from the group consisting of oligomers having a polyene structure and derivatives thereof. Therefore, for example, when the anode is used for batteries, decomposition reaction of the electrolyte can be inhibited, and cycle characteristics can be improved.

In particular, when the anode has the anode active material layer which is capable of inserting and extracting an electrode reactant and contains at least one of metal elements and metalloid elements as an element, or when the anode has an anode active material layer containing at least one of silicon and tin as an element, high effects can be obtained.

Additional features and advantages are described herein, and will be apparent from, the following Detailed Description and the figures.

DETAILED DESCRIPTION

Figure 1:
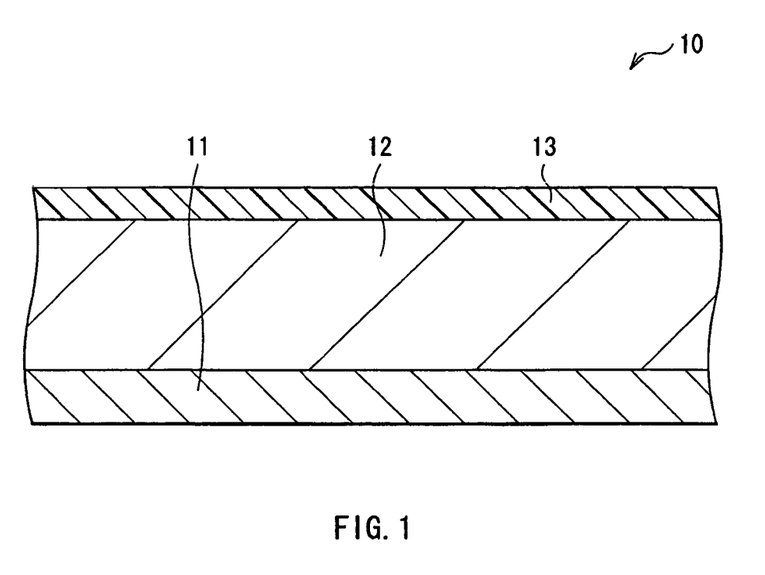
FIG. 1 is a cross section showing a structure of an anode according to an embodiment of the present invention.

Various embodiments are described below in greater detail without limitation and with reference to the figures. FIG. 1 shows an outline structure of an anode 10 according to an embodiment of the present invention.

The anode 10 has a structure in which for example, an anode active material layer 12 is provided on an anode current collector 11 having a pair of opposed faces. In FIG. 1, the case in which the anode active material layer is provided on the single face of the anode current collector 11 is shown. However, the anode active material layer may be provided on the both faces of the anode current collector 11. The anode current collector 11 is made of, for example, a metal foil such as a copper (Cu) foil, a nickel (Ni) foil, and a stainless foil.

The anode active material layer 12 contains, for example, one or more anode materials capable of inserting and extracting an electrode reactant as an anode active material. As such an anode material, for example, when the electrode reactant is lithium, a substance containing at least one of metal elements and metalloid elements capable of forming an alloy with lithium as an element can be cited. Such a substance may be a simple substance, an alloy, or a compound of a metal element or a metalloid element, or a material having one or more phases thereof at least in part. In the present invention, alloys include an alloy containing one or more metal elements and one or more metalloid elements in addition to an alloy composed of two or more metal elements. Further, an alloy may contain nonmetallic elements. The texture thereof includes a solid solution, a eutectic crystal (eutectic mixture), an intermetallic compound, and a structure, in which two or more thereof coexist.

As a metal element or a metalloid element capable of forming an alloy with lithium, for example, magnesium (Mg), boron (B), aluminum, gallium (Ga), indium (In), silicon, germanium (Ge), tin, lead (Pb), bismuth (Bi), cadmium (Cd), silver (Ag), zinc (Z), hafnium (Hf), zirconium (Zr), yttrium (Y), palladium (Pd), platinum (Pt) or the like can be cited.

Specially, as such an anode material, a material containing a metal element or a metalloid element of Group 14 in the long period periodic table as an element is preferable. A material containing at least one of silicon and tin as an element is particularly preferable. Silicon and tin have a high ability to insert and extract lithium, and provide a high energy density. Specifically, for example, a simple substance, an alloy, or a compound of silicon; a simple substance, an alloy, or a compound of tin; or a material having one or more phases thereof at least in part can be cited.

As an alloy of silicon, for example, an alloy containing at least one from the group consisting of tin, nickel, copper, iron (Fe), cobalt (Co), manganese (Mn), zinc, indium, silver, titanium (Ti), germanium, bismuth, antimony (Sb), and chromium (Cr) as a second element other than silicon can be cited. As an alloy of tin, for example, an alloy containing at least one from the group consisting of silicon, nickel, copper, iron, cobalt, manganese, zinc, indium, silver, titanium, germanium, bismuth, antimony, and chromium as a second element other than tin can be cited.

As a compound of tin or a compound of silicon, for example, a compound containing oxygen (O) or carbon (C) can be cited. In addition to tin or silicon, the compound may contain the foregoing second element.

Specially, as such an anode material, a CoSnC-containing material containing tin, cobalt, and carbon as an element, in which the carbon content is from 9.9 wt % to 29.7 wt %, and the ratio of cobalt to the total of tin and cobalt is from 30 wt % to 70 wt % is preferable. In such a composition range, a high energy density can be obtained, and superior cycle characteristics can be obtained.

The CoSnC-containing material may further contain other elements if necessary. As other element, for example, silicon, iron, nickel, chromium, indium, niobium (Nb), germanium, titanium, molybdenum (Mo), aluminum, phosphorus (P), gallium (Ga), or bismuth is preferable. Two or more thereof may be contained, since a capacity or cycle characteristics can be thereby further improved.

The CoSnC-containing material has a phase containing tin, cobalt, and carbon. The phase preferably has a structure with low crystallinity or an amorphous structure. Further, it is preferable that in the CoSnC-containing material, at least part of carbon as the element is bonded to a metal element or a metalloid element, which is other element. It is believed that lowered cycle characteristics are caused by cohesion or crystallization of tin or the like; however, such cohesion or crystallization can be inhibited by bonding carbon to other element.

As a measuring method for examining bonding state of elements, for example, X-ray Photoelectron Spectroscopy (XPS) can be cited. In XPS, in the case of graphite, the peak of 1 s orbital of carbon (C1s) is observed at 284.5 eV in the apparatus, in which energy calibration is made so that the peak of 4f orbital of gold atom (Au4f) is observed at 84.0 eV. In the case of surface contamination carbon, the peak is observed at 284.8 eV. Meanwhile, in the case of higher electric charge density of carbon element, for example, when carbon is bonded to a metal element or a metalloid element, the peak of C1s is observed in the region lower than 284.5 eV. That is, when the peak of the composite wave of C1s obtained for the CoSnC-containing material is shown in the region lower than 284.5 eV, at least part of carbon contained in the CoSnC-containing material is bonded to the metal element or the metalloid element, which is other element.

In XPS measurement, for example, the peak of C1s is used for correcting the energy axis of spectrums. Since surface contamination carbon generally exists on the surface, the peak of C1s of the surface contamination carbon is set to 284.8 eV, which is used as an energy reference. In XPS measurement, the waveform of the peak of C1s is obtained as a form including the peak of the surface contamination carbon and the peak of carbon in the CoSnC-containing material. Therefore, by analyzing the waveform by using a commercially available software or the like, the peak of the surface contamination carbon and the peak of carbon in the CoSnC-containing material are separated. In the analysis of the waveform, the position of the main peak existing on the lowest bound energy side is set to the energy reference (284.8 eV).

As an anode material capable of inserting and extracting an electrode reactant, for example, a carbon material such as graphite, non-graphitizable carbon, and graphitizable carbon may be used. Further, such carbon material may be used together with the foregoing anode material. The carbon materials are preferably used with following reasons. In the carbon material, change in crystal structure due to insertion and extraction of lithium is very little, and for example, when the carbon material is used with the foregoing anode material, a higher energy density can be obtained and superior cycle characteristics can be obtained, and functions as an electrical conductor.

The anode active material layer 12 may further contain other anode active material. Further, the anode active material layer 12 may contain other material such as a binder and a thickener.

Further, the anode 10 has a coating 13 containing an oligomer having a polyene structure or a derivative thereof on the surface of the anode active material layer 12. The coating 13 may contain one kind of oligomers having a polyene structure or one kind of derivatives thereof, or two kinds or more of oligomers having a polyene structure or two kinds or more of derivatives thereof. Otherwise, the coating 13 may contain an oligomer and a derivative thereof together. Thereby, in the anode 10, oxidation of the anode active material layer 12 can be inhibited, and side reaction in the anode 10 can be inhibited. The thickness of the coating 13 is preferably, for example, 100 nm or less. The thicker the film thickness is, the larger the electrode resistance becomes.

The anode 10 can be manufactured as follows, for example.

First, for example, the anode active material layer 12 is formed on the anode current collector 11. The anode active material layer 12 may be formed by, for example, vapor-phase deposition method, liquid-phase deposition method, the thermal spraying process, firing method, or coating. Two or more methods thereof may be combined.

As a vapor-phase deposition method, for example, physical deposition method or chemical deposition method can be used. Specifically, vacuum vapor deposition method, sputtering method, ion plating method, laser ablation method, thermal CVD (Chemical Vapor Deposition) method, plasma CVD method and the like are available. As liquid-phase deposition method, a known technique such as electrolytic plating and electroless plating is available. As thermal spraying process, any of plasma 1 spraying process, high-velocity gas flame spraying process, arc spraying process and the like may be used.

Firing method is a method in which, for example, a particulate anode active material, a binder and the like are mixed, the mixture is dispersed in a solvent, an anode current collector is coated with the resultant, which is heat-treated at temperatures higher then the melting point of a binder or the like. For firing method, known techniques are available. For example, atmosphere firing method, reaction firing method, or hot press firing method is available. In the case of coating, for example, a particulate anode active material, a binder and the like are mixed and dispersed in a solvent, an anode current collector is coated with the resultant, which is dried and compression-molded. Thereby, the anode active material layer is formed.

Next, the coating 13 is formed on the anode active material layer 12. For example, the coating 13 containing an oligomer having a polyene structure or a derivative thereof may be directly formed on the anode active material layer 12 by spin coating method, vapor-phase deposition method or the like. Otherwise, it is possible that a film containing a precursor generating an oligomer having a polyene structure or a derivative is formed by spin coating method, vapor-phase deposition method or the like, and then the precursor is reacted by heat treatment or the like to form the coating 13.

Further, the coating 13 may be electrochemically formed on the anode active material layer 12. For example, it is possible that by dissolving an oligomer having a polyene structure or a derivative thereof in an electrolytic solution, in which an electrolyte salt is dissolved in a solvent and conducting current thereto, the coating 13 is precipitated on the anode active material layer 12. Otherwise, it is possible that by dissolving a precursor generating an oligomer having a polyene structure or a derivative thereof in an electrolytic solution, conducting current thereto, the precursor is reacted to precipitate the coating 13.

The anode 10 is used for secondary batteries as follows, for example. In the following secondary batteries, the case using lithium as an electrode reactant will be described.

Figure 2:
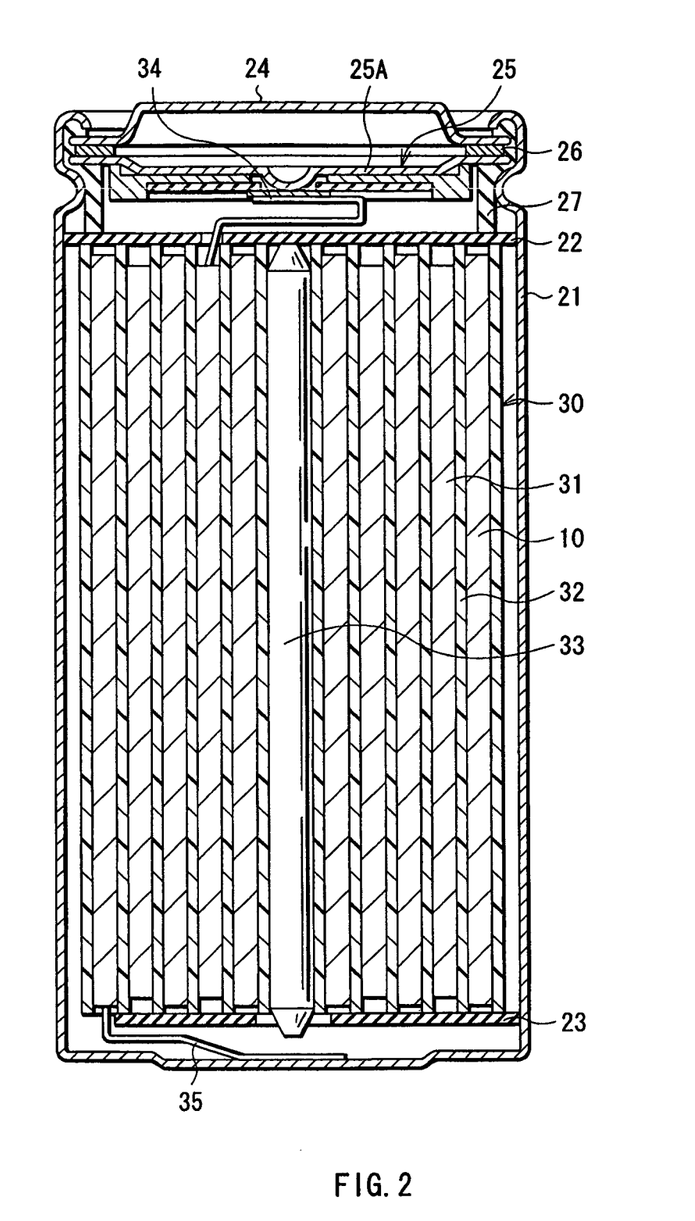
FIG. 2 is a cross section showing a structure of a first secondary battery using the anode according to the embodiment of the present invention.

FIG. 2 shows a cross sectional structure of a first secondary battery using the anode 10 according to this embodiment. The secondary battery is a so-called cylinder-type battery, and has a spirally wound electrode body 30 in which the strip-shaped anode 10 and a strip-shaped cathode 31 are wound with a separator 32 inbetween inside a battery can 21 in the shape of approximately hollow cylinder. The battery can 21 is made of, for example, iron plated by nickel. One end of the battery can 21 is closed, and the other end thereof is opened. Inside the battery can 21, a pair of insulating plates 22 and 23 is respectively arranged perpendicular to the winding periphery face, so that the spirally wound electrode body 30 is sandwiched between the insulating plates 22 and 23.

At the open end of the battery can 21, a battery cover 24, and a safety valve mechanism 25 and a PTC (Positive Temperature Coefficient) device 26 provided inside the battery cover 24 are attached by being caulked through a gasket 27. Inside of the battery can 21 is thereby hermetically sealed. The battery cover 24 is, for example, made of a material similar to that of the battery can 21. The safety valve mechanism 25 is electrically connected to the battery cover 24 through the PTC device 26. When the internal pressure of the battery becomes a certain level or more by internal short circuit, external heating or the like, a disk plate 25A flips to cut the electrical connection between the battery cover 24 and the spirally wound electrode body 30. When temperatures rise, the PTC device 26 limits a current by increasing the resistance value to prevent abnormal heat generation by a large current. The gasket 27 is made of, for example, an insulating material and its surface is coated with asphalt.

For example, a center pin 33 is inserted in the center of the spirally wound electrode body 30. A cathode lead 34 made of aluminum or the like is connected to the cathode 31 of the spirally wound electrode body 30 An anode lead 35 made of nickel or the like is connected to the anode 10. The cathode lead 34 is electrically connected to the battery cover 24 by being welded to the safety valve mechanism 25. The anode lead 35 is welded and electrically connected to the battery can 21.

Figure 3:
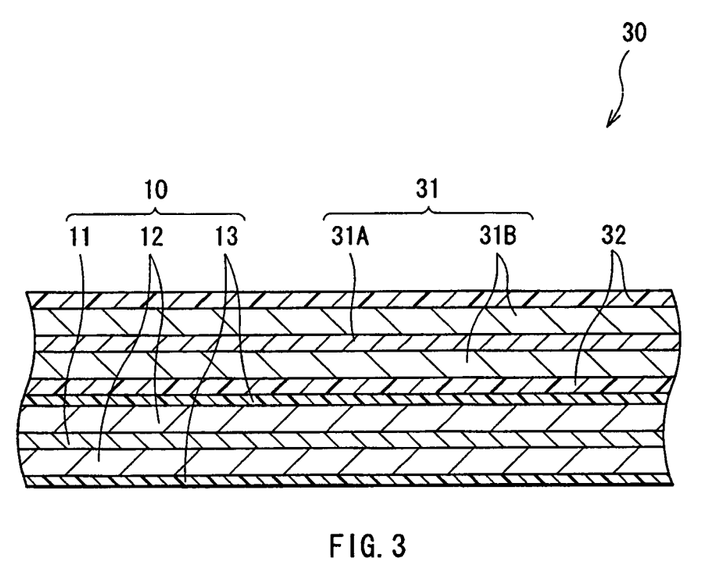
FIG. 3 is a cross section showing an enlarged part of a spirally wound electrode body in the secondary battery shown in FIG. 2.

FIG. 3 shows an enlarged part of the spirally wound electrode body 30 shown in FIG. 2. The cathode 31 has a structure in which, for example, a cathode active material layer 31B is provided on the both faces or the single face of a cathode current collector 31A having a pair of opposed faces. The cathode current collector 31A is made of, for example, a metal foil such as an aluminum foil, a nickel foil, and a stainless foil.

The cathode active material layer 31B contains, for example, as a cathode active material, one or more cathode materials capable of inserting and extracting lithium. If necessary, the cathode active material layer 31B may contain a conductive material such as a carbon material and a binder such as polyvinylidene fluoride. As a cathode material capable of inserting and extracting lithium, for example, a lithium complex oxide containing lithium and transition metals or a lithium phosphate compound is preferable. The lithium complex oxide containing lithium and transition metals and the lithium phosphate compound can generate a high voltage, and can contribute to a high capacity.

As a lithium complex oxide or a lithium phosphate compound, a compound containing, as a transition metal, at least one from the group consisting of cobalt, nickel, manganese, iron, aluminum, vanadium (V), titanium, chromium, and copper is preferable. In particular, a compound containing at least one from the group consisting of cobalt, nickel, and manganese is preferable. The formula thereof is expressed by, for example, $Li_xMIO_2$ or $Li_yMIIPO_4$. In the formula, MI and MII represent one or more transition metal elements. Values of x and y vary according to charge and discharge states of the battery, and the values of x and y are generally in the range of $0.05 \le x \le 1.10$ 1.10 and $0.05 \le y \le 1.10$.

As a specific example of the complex oxide containing lithium and transition metal elements, a lithium cobalt complex oxide ($Li_xCoO_2$), a lithium nickel complex oxide ($Li_xNiO_2$), a lithium nickel cobalt complex oxide ($Li_xNi_{1-v}CovO_2$ (v<1)), or a lithium manganese complex oxide having a spinel type structure ($Li_xMn_2O_4$) can be cited. As a lithium phosphate compound, for example, lithium iron phosphate compound ($LiFePO_4$) or a lithium iron manganese phosphate compound ($LiFe_{i-z}Mn_zPO_4$ (z<1)) can be cited.

The separator 32 separates the anode 10 from the cathode 31, prevents current short circuit due to contact of both electrodes, and lets through lithium ions. The separator 32 is made of, for example, a synthetic resin porous film made of polytetrafluoroethylene, polypropylene, polyethylene or the like, or a ceramics porous film. The separator 32 may have a structure in which two or more of the foregoing porous films are layered.

An electrolytic solution as the liquid electrolyte is impregnated in the separator 32. The electrolytic solution contains, for example, a solvent and an electrolyte salt dissolved in the solvent. If necessary, various additives may be contained.

As a solvent, for example, a nonaqueous solvent such as propylene carbonate, ethylene carbonate, diethyl carbonate, dimethyl carbonate, 1,2-dimethoxy ethane, 1,2-diethoxy ethane, γ-butyrolactone, tetrahydrofuran, 1,3-dioxolane, 4-methyl-1,3-dioxolane, diethyl ether, sulfolane, methyl sulfolane, acetonitrile, propionitrile, vinylene carbonate, halogenated chain ester carbonate, and halogenated cyclic ester carbonate can be cited. The solvent may be used singly, or two or more thereof may be used by mixing.

As an electrolyte salt, for example, a lithium salt such as $LiPF_6$, $LiBF_4$, $LiClO_4$, $LiAsF_6$, $LiB(C_6H_5)_4$, LiCl, LiBr, $LiCH_3SO_3$, and $LiCF_3SO_3$ can be cited. As an electrolyte salt, any of the forgoing may be used singly, or two or more thereof may be used by mixing.

Further, the electrolytic solution may contain one or more of the foregoing oligomer having a polyene structure, the derivative thereof, and a precursor generating the oligomer having a polyene structure or the derivative thereof by reaction.

The secondary battery can be manufactured, for example, as follows.

First, the anode 10 is formed as described above, and the cathode active material layer 31B is formed on the cathode current collector 31A to form the cathode 31. The cathode active material layer 31B is formed by, for example, mixing a particulate cathode active material, an electrical conductor, and a binder to prepare a cathode mixture, which is dispersed in a solvent, and then coating the cathode current collector 31A with the resultant, which is dried and compression-molded.

Subsequently, the anode lead 35 is attached to the anode current collector 11 by welding or the like, and the cathode lead 34 is attached to the cathode current collector 31A by welding or the like. Subsequently, the anode 10 and the cathode 31 are wound with the separator 32 inbetween. The end of the anode lead 35 is welded to the battery can 21, and the end of the cathode lead 34 is welded to the safety valve mechanism 25. The wound anode 10 and the wound cathode 31 are sandwiched between the pair of insulating plates 12 and 13, and contained inside the battery can 21. After the anode 10 and the cathode 31 are contained in the battery can 21, an electrolytic solution is injected into the battery can 21 and impregnated in the separator 32. After that, at the open end of the battery can 21, the battery cover 24, the safety valve mechanism 25, and the PTC device 26 are fixed by being caulked through the gasket 27. The secondary battery shown in FIG. 2 is thereby completed.

In the secondary battery, when charged, for example, lithium ions are extracted from the cathode 31 and inserted in the anode 10 through the electrolytic solution. When discharged, for example, lithium ions are extracted from the anode 10 and inserted in the cathode 31 through the electrolytic solution. Here, since the coating 13 containing an oligomer having a polyene structure or a derivative thereof is formed on the surface of the anode 10, oxidation of the anode active material layer 12 is inhibited, and decomposition reaction of the electrolytic solution in the anode 10 is inhibited.

In particular, when the substance containing, as an element, at least one of metal elements and metalloid elements capable of forming an alloy with lithium is used as an anode active material, activity of the anode 10 becomes high. However, by providing the foregoing coating 13 on the anode 10, decomposition reaction is effectively inhibited.

Figure 4:
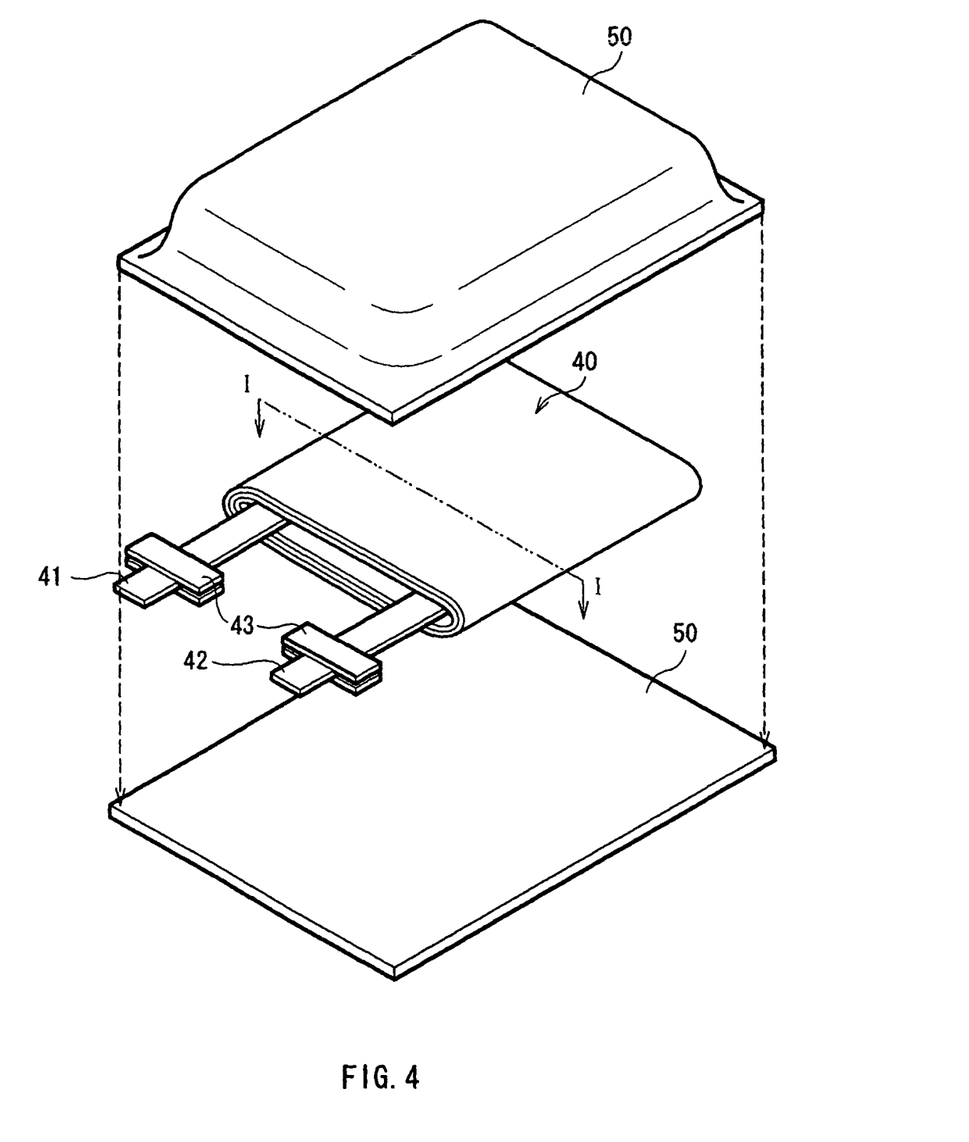
FIG. 4 is an exploded perspective view showing a structure of a second secondary battery using the anode according to the embodiment of the present invention.

FIG. 4 shows a structure of a second secondary battery. The secondary battery is a so-called laminated film-type secondary battery. In the secondary battery, a spirally wound electrode body 40 to which a cathode lead 41 and an anode lead 42 are attached is contained inside a film package member 50.

The cathode lead 41 and the anode lead 42 are respectively directed from inside to outside of the package member 50 in the same direction, for example. The cathode lead 41 and the anode lead 42 are respectively made of, for example, a metal material such as aluminum, copper, nickel, and stainless, and are in a state of thin plate or mesh, respectively.

The package member 50 is made of a rectangular aluminum laminated film in which, for example, a nylon film, an aluminum foil, and a polyethylene film are bonded together in this order. The package member 50 is, for example, arranged so that the polyethylene film side and the spirally wound electrode body 40 are opposed, and the respective outer edges are contacted to each other by fusion bonding or an adhesive. Adhesive films 43 to protect from outside air intrusion are inserted between the package member 50 and the cathode lead 41, the anode lead 42. The adhesive film 43 is made of a material having contact characteristics to the cathode lead 41 and the anode lead 42 such as a polyolefin resin of polyethylene, polypropylene, modified polyethylene, and modified polypropylene.

The package member 50 may be made of a laminated film having other structure, a high molecular weight film such as polypropylene, or a metal film, instead of the foregoing aluminum laminated film.

Figure 5:
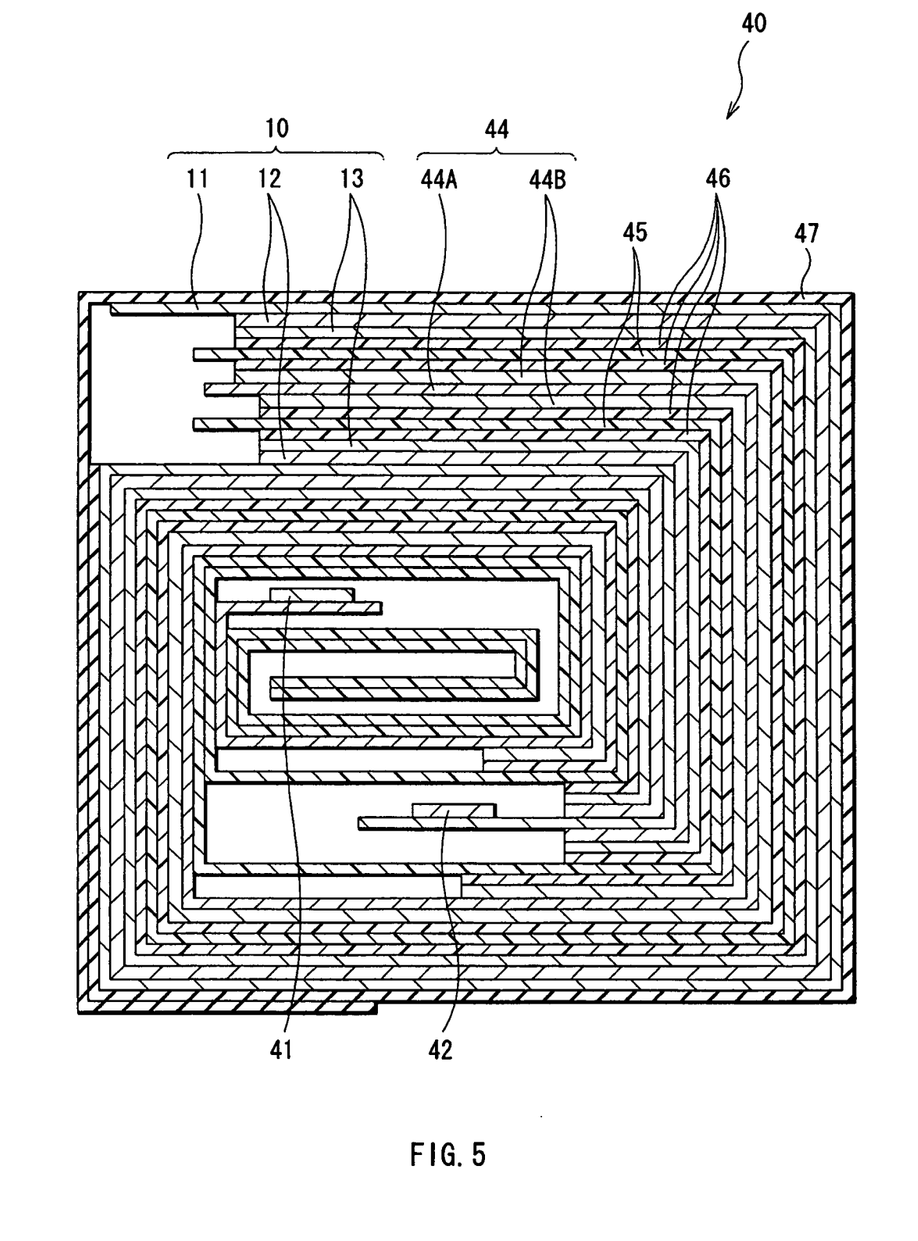
FIG. 5 is a cross section showing a structure taken along line I-I of a spirally wound electrode body shown in FIG. 4.

FIG. 5 shows a cross sectional structure taken along line I-I of the spirally wound electrode body 40 shown in FIG. 4. In the spirally wound electrode body 40, the anode 10 and a cathode 44 are layered with a separator 45 and an electrolyte layer 46 inbetween and wound. The outermost periphery thereof is protected by a protective tape 47.

The cathode 44 has a structure in which a cathode active material layer 44B is provided on the single face or the both faces of the cathode current collector 44A. The anode 10 also has a structure in which the anode active material layer 12 is provided on the single face or the both faces of the anode current collector 11. Arrangement is made so that the anode active material layer 12 and the cathode active material layer 44B are opposed. Structures of the cathode current collector 44A, the cathode active material layer 44B, and the separator 45 are similar to of the cathode current collector 31A, the cathode active material layer 31B, and the separator 32 in the first secondary battery described above.

The electrolyte layer 46 is in a so-called gelatinous state, containing an electrolytic solution and a high molecular weight compound to become a holding body, which holds the electrolytic solution. The gelatinous electrolyte is preferable, since a high ion conductivity can be thereby obtained, and leak of the battery can be thereby prevented. The structure of the electrolytic solution (that is, a solvent, an electrolyte salt and the like) is similar to of the first secondary battery described above. As a high molecular weight material, for example, an ether high molecular weight compound such as polyethylene oxide and a cross-linked body containing polyethylene oxide, an ester high molecular weight compound such as poly methacrylate or an acrylate high molecular weight compound, or a polymer of vinylidene fluoride such as polyvinylidene fluoride and a copolymer of vinylidene fluoride and hexafluoro propylene can be cited. One or more thereof are used by mixing. In particular, in view of redox stability, a fluorinated high molecular weight compound such as the polymer of vinylidene fluoride is desirably used.

The secondary battery can be manufactured, for example, as follows.

First, as described above, the anode 10 and the cathode 44 are formed. After that, the anode 10 and the cathode 44 are respectively coated with a precursor solution containing an electrolytic solution, a high molecular weight compound, and a mixed solvent. The mixed solvent is volatilized to form the electrolyte layer 46. Next, the anode lead 42 is attached to the end of the anode current collector 11 by welding, and the cathode lead 41 is attached to the end of the cathode current collector 44A by welding. Subsequently, the anode 10 and the cathode 44 formed with the electrolyte layer 46 are layered with the separator 45 inbetween to obtain a lamination. After that, the lamination is wound in the longitudinal direction, the protective tape 47 is adhered to the outermost periphery thereof to form the spirally wound electrode body 40. Lastly, for example, the spirally wound electrode body 40 is sandwiched between the package members 50, and outer edges of the package members 50 are contacted by thermal fusion-bonding or the like to enclose the spirally wound electrode body 40. Then, the adhesive films 43 are inserted between the cathode lead 41, the anode 42 and the package member 50. Thereby, the secondary battery shown in FIG. 4 and FIG. 5 is completed.

Otherwise, the secondary battery may be fabricated as follows. First, the anode 10 and the cathode 44 are formed, and the cathode lead 41 and the anode lead 42 are attached to the anode 10 and the cathode 44. After that, the anode 10 and the cathode 44 are layered with the separator 45 in between and wound. The protective tape 47 is adhered to the outermost periphery thereof, and a winding body as the precursor of the spirally wound electrode body 40 is formed. Next, the winding body is sandwiched between the package members 50, the outermost peripheries except for one side are thermal fusion-bonded to obtain a pouched state, and the winding body is contained inside the package member 50. Subsequently, a composition of matter for electrolyte containing an electrolytic solution, a monomer, the raw material for the high molecular weight compound, a polymerization initiator, and if necessary other material such as a polymerization inhibitor is prepared, which is injected into the package member 50.

After the composition of matter for electrolyte is injected, the opening of the package member 50 is thermal fusion-bonded and hermetically sealed in the vacuum atmosphere. Next, the resultant is heated to polymerize the monomer to obtain a high molecular weight compound. Thereby, the gelatinous electrolyte layer 46 is formed, and the secondary battery shown in FIG. 4 and FIG. 5 is assembled.

The secondary battery works similarly to the first secondary battery described above.

As above, according to this embodiment, the coating 13 containing at least one from the group consisting of oligomers having a polyene structure and derivatives thereof is provided on the anode 10. Therefore, oxidation of the anode active material layer 12 can be inhibited, and decomposition reaction of the electrolytic solution can be inhibited. Therefore, battery characteristics such as cycle characteristics can be improved.

Further, when the substance containing as an element at least one of metal elements and metalloid elements capable of forming an alloy with lithium is used as an anode active material, in particular, when the substance containing at least one of tin and silicon as an element is used, hither effects can be obtained.

EXAMPLES

Further, specific examples of the present invention will be hereinafter given in detail.

Examples 1-1 and 1-2

Figure 6:
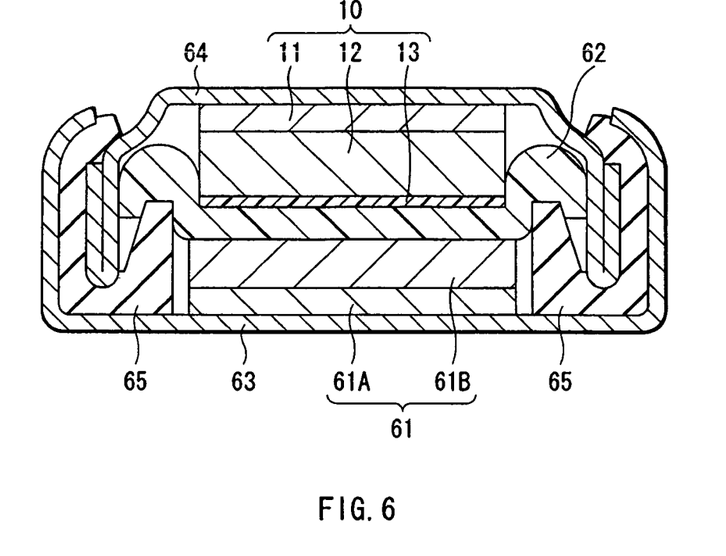
FIG. 6 is a cross section showing a structure of a secondary battery fabricated in examples of the present invention.

A coin-type secondary battery as shown in FIG. 6 was fabricated. In the secondary battery, the anode 10 and a cathode 61 were layered with a separator 62 inbetween, and the lamination was enclosed between a package can 63 and a package cup 64.

First, by using silicon as an anode active material, the anode active material layer 12 made of silicon was formed on the anode current collector 11 made of a copper foil by vacuum vapor deposition method. The resultant was heat-treated for 12 hours at 200 deg C. in the vacuum atmosphere. Next, as a precursor generating an oligomer having a polyene structure or a derivative thereof, polyvinyl chloride for Example 1-1 and polyvinyl alcohol for Example 1-2 were respectively prepared, which were dissolved in N-methyl-2-pyrrolidone. Subsequently, the anode active material layer 12 was coated with these solutions, and polyvinyl chloride or polyvinyl alcohol was reacted by heat treatment to form the coating 13 and form the anode 10.

Further, lithium cobalt complex oxide ($LiCoO2$) was prepared as a cathode active material. 91 parts by weight of the lithium cobalt complex oxide powder, 6 parts by weight of graphite as the electrical conductor, 3 parts by weight of polyvinylidene fluoride as the binder were mixed, and the mixture was dispersed in N-methyl-2-pyrrolidone as the solvent. Next, a cathode current collector 61A made of an aluminum foil was coated with the resultant, which was dried, and then compression-molded by a rolling press machine to form a cathode active material layer 61B and form the cathode 61.

Subsequently, the formed anode 10 and the formed cathode 61 with the separator 62 made of a micro porous polypropylene film inbetween were laid on the package can 63, over which an electrolytic solution was injected, the package cup 64 was laid thereon, and the package can 63 and the package cup 64 were hermetically sealed by being caulked with a gasket 65. For the electrolytic solution, the electrolytic solution obtained by dissolving $LiC1O4$ as an electrolyte salt at a concentration of 1 mol/l in the solvent in which ethylene carbonate and diethyl carbonate were mixed at a volume ratio of 1:1 was used.

Further, as Comparative example 1 relative to Examples 1-1 and 1-2, a secondary battery was fabricated as in Examples 1-1 and 1-2, except that the coating was not formed on the anode.

For the fabricated secondary batteries of Examples 1-1, 1-2, and Comparative example 1, charge and discharge test was performed at 23 deg C. Then, the discharge capacity at the 30th cycle, the charge and discharge efficiency at the 30th cycle, and the capacity retention ratio at the 30th cycle were obtained. Charge was performed until the battery voltage reached 4.2 V at a constant current density of 1 $mA/cm^2$, and then performed until the current density reached 0.02 $mA/cm^2$ at a constant voltage of 4.2 V. Discharge was performed until the battery voltage reached 2.5 V at a constant current density of 1 $mA/cm^2$. The charge and discharge efficiency at the 30th cycle is a ratio of the discharge capacity at the 30 cycle to the charge capacity at the 30th cycle. The capacity retention ratio at the 30th cycle is a ratio of the discharge capacity at the 30th cycle to the discharge capacity at the first cycle. The obtained results are shown in Table 1.

TABLE 1

| | Anode active material layer | | Coating | | Discharge capacity (mAh) | Charge and discharge efficiency (%) | Capacity retention ratio (%) |
|---|---|---|---|---|---|---|---|
| | Anode active material | Forming method | Precursor | Forming | | | |
| Example 1-1 | Si | Vapor deposition | Polyvinyl chloride | Coating + heat treatment | 4.88 | 99.3 | 83 |
| Example 1-2 | Si | Vapor deposition | Polyvinyl alcohol | Coating + heat treatment | 4.73 | 99.1 | 82 |
| Comparative example 2 | Si | Vapor deposition | — | | 3.99 | 97.5 | 76 |

Figure 7:
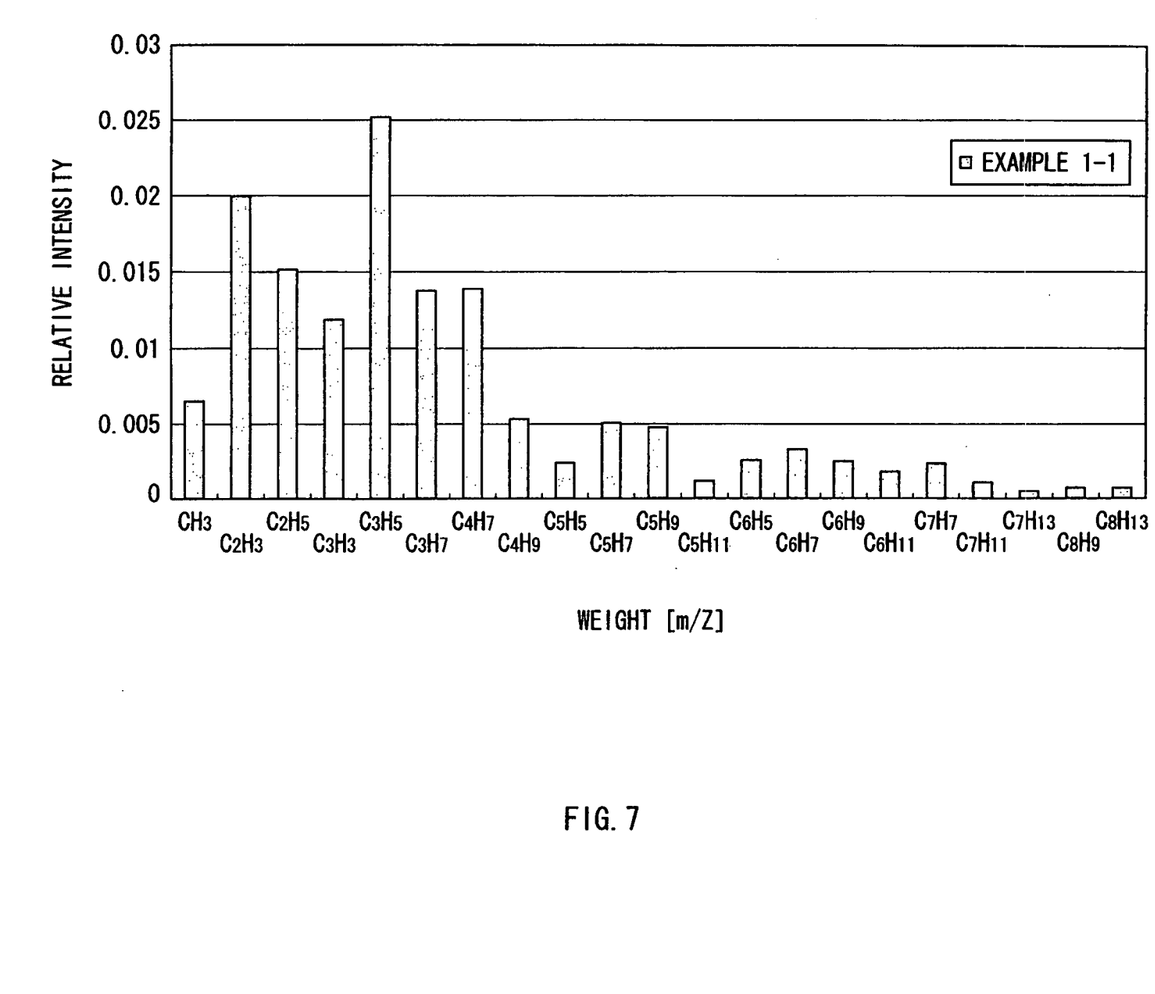
FIG. 7 is a characteristics view showing results of positive ion analysis of an anode according to Example 1-1.

Further, for the secondary batteries of Examples 1-1 and 1-2, charge and discharge were performed 30 cycles, and then the secondary batteries were decomposed to take out the anode 10. The taken out anode 10 was washed with dimethyl carbonate, vacuum-dried, and provided with a positive ion analysis by a Time of Flight-Secondary Ion Mass Spectrometry (TOF-SIMS). For the analysis, TFS-2000 of Ulvac-phi, Inc. was used. Analysis conditions were primary ion of $^{197}Au^+$, ion current of 2 nA (measuring value by continuous beam), weight range from 1 to 1850 amu, and scanning range of 300×300 μm$^2$. As a representative result, results of Example 1-1 are shown in FIG. 7. Though not shown, for Example 1-2, results similar to of FIG. 7 were obtained.

As shown in FIG. 7, representative peak of carbon hydride ion obtained when an oligomer having a polyene structure or a derivative thereof is analyzed, for example, $C_3H_5^+$, $C_3H_7^+$, $C_4H_7^+$, $C_4H_9^+$, $C_5H_9^+$, $C_5H_{11}^+$, $C_6H_5^+$, $C_6H_{11}^+$, $C_7H_7^+$, $C_7H_{11}^+$, $C_8H_9^+$, and $C_8H_{13}^+$ were detected. Further, peaks of silicon ion (Si$^+$) composing the anode active material layer 12 were not detected. That is, it was confirmed that the coating 13 containing an oligomer having a polyene structure or a derivative thereof was formed on the anode active material layer 12.

Further, as shown in Table 1, according to Examples 1-1 and 1-2 in which the coating 13 was formed, compared to Comparative example 1 in which the coating was not formed, higher values could be obtained for all the discharge capacity, the charge and discharge efficiency, and the capacity retention ratio. That is, it was found that when the anode 10 had the coating 13 containing at least one from the group consisting of oligomers having a polyene structure and derivatives thereof, the discharge capacity, the charge and discharge efficiency, and the capacity retention ratio could be improved.

Secondary batteries in which the structure of the coating 13 was changed from of Examples 1-1 and 1-2 were fabricated. First, the anode active material layer 12 was formed on the anode current collector 11 as in Examples 1-1 and 1-2. Further, as in Examples 1-1 and 1-2, the cathode 61 was formed, the anode current collector 11 formed with the anode active material layer 12 and the cathode 61 were layered with the separator 62 made of a micro porous polypropylene film inbetween, and batteries were assembled as in Examples 1-1 and 1-2. Then, as a precursor generating an oligomer having a polyene structure or a derivative thereof, 1,3,5,7-cyclooctatetraene for Example 1-3 and poly[bis (benzylthio)acetylene] for Example 1-4 were prepared and added to the electrolytic solution.

For the secondary batteries of Examples 1-3 and 1-4, charge and discharge were performed as in Examples 1-1 and 1-2, and the discharge capacity at the 30th cycle, the charge and discharge efficiency at the 30th cycle, and the capacity retention ratio at the 30th cycle were obtained. The results are shown in Table 2 with the results of Comparative example 1. Further, for the secondary batteries of Examples 1-3 and 1-4, the anode 10 was also taken out as in Examples 1-1 and 1-2. Then, the taken out anode 10 was provided with positive ion analysis by a TOF-SIMS. In the result, peaks similar to Examples 1-1 and 1-2 were detected. That is, it was confirmed that the coating 13 containing an oligomer having a polyene structure or a derivative thereof was formed on the anode active material layer 12.

TABLE 2

| | Anode active material layer | | Coating | | Discharge capacity (mAh) | Charge and discharge efficient (%) | Capacity retention ratio (%) |
|---|---|---|---|---|---|---|---|
| | Anode active layer | Forming method | Precursor | Forming method | | | |
| Example 1-3 | Si | Vapor deposition | Cyclooctatetraene | Charge and discharge | 5.23 | 99.5 | 85 |
| Example 1-4 | Si | Vapor deposition | Poly [bis (benzylthio) acetylene] | Charge and discharge | 4.92 | 99.4 | 83 |
| Comparative example 1 | Si | Vapor deposition | — | | 3.99 | 97.5 | 76 |

As shown in Table 2, according to Examples 1-3 and 1-4, as in Examples 1-1 and 1-2, compared to Comparative example 1, higher values could be obtained for all the discharge capacity, the charge and discharge efficiency, and the capacity retention ratio. That is, it was found that when the coating 13 containing at least one from the group consisting of oligomers having a polyene structure and derivatives thereof is provided, characteristics could be improved.

Secondary batteries were fabricated as in Examples 1-1, 1-2, 1-3, and 1-4, except that structures of the anode active material layer 12 was changed. Specifically, as an anode active material, a CoSnC-containing material was used instead of silicon. 90 parts by weight of the CoSnC-containing material powder and 10 parts by weight of polyvinylidene fluoride as the binder were mixed, and the mixture was dispersed in N-methyl-2-pyrrolidone as the solvent. The anode current collector 11 was coated with the resultant, which was dried, and then compression-molded by a rolling press machine to form the anode active material layer 12.

The CoSnC-containing material was synthesized by utilizing mechanochemical reaction by using a planetary ball mill by adding carbon powder to cobalt-tin alloy powder. For the obtained CoSnC-containing material, composition analysis was performed. The cobalt content was 31.7 wt %, the tin content was 47.5 wt %, and the carbon content was 19.8 wt %. The carbon content was measured by a carbon sulfur analyzer. The contents of cobalt and tin were measured by ICP (Inductively Coupled Plasma) optical emission spectroscopy.

Further, regarding the obtained CoSnC-containing material, X-ray diffraction was performed. In the result, the diffraction peak having a wide half value width with the diffraction angle 20 of 1.0 degree or more was observed in the range of diffraction angle 20=20 to 50 degrees. Further, when XPS was performed on the CoSnC-containing material, the peak of CIs in the CoSnC-containing material was obtained in the region lower than 284.5 eV. That is, it was confirmed that carbon in the CoSnC-containing material was bonded to other element.

Further, in Example 2-1, as in Example 1-1, the coating 13 was formed by using polyvinyl chloride as a precursor generating an oligomer having a polyene structure or a derivative thereof, coating the anode active material layer 12 with the precursor, which was heat-treated. In Example 2-2, as in Example 1-2, the coating 13 was formed by using polyvinyl alcohol as a precursor generating an oligomer having a polyene structure or a derivative thereof, coating the anode active material layer 12 with the precursor, which was heat-treated. In Example 2-3, as in Example 1-3, the coating 13 was formed by using 1,3,5,7-cyclooctatetraene as a precursor generating an oligomer having a polyene structure or a derivative thereof, which was added to the electrolytic solution and provided with charge and discharge. In Example 2-4, as in Example 1-4, the coating 13 was formed by using poly[bis (benzylthio) acetylene] as a precursor generating an oligomer having a polyene structure or a derivative thereof, which was added to the electrolytic solution and provided with charge and discharge.

As Comparative example 2 relative to Examples 2-1 to 2-4, a secondary battery was fabricated as in Examples 2-1 to 2-4, except that the coating 13 was not formed.

For the fabricated secondary batteries of Examples 2-1 to 2-4 and Comparative example 2, charge and discharge test was performed as in Examples 1-1 to 1-4. Then, the discharge capacity at the 30th cycle, the charge and discharge efficiency at the 30th cycle, and the capacity retention ratio at the 30th cycle were obtained. The results are shown in Table 3. Further, for the secondary batteries of Examples 2-1 to 2-4, as in Examples 1-1 to 1-4, the anode 10 was taken out, and positive ion analysis was performed by a TOF-SIMS. In the result, peaks similar to of Examples 1-1 to 1-4 were detected. That is, it was confirmed that the coating 13 containing an oligomer having a polyene structure or a derivative thereof was formed on the anode active material layer 12.

TABLE 3

| | Anode active material layer | | Coating | | Charge and | | |
|---|---|---|---|---|---|---|---|
| | Anode active material | Forming method | Precuror | Forming method | Discharge capacity (mAh) | discharge efficiency (%) | Capacity retention ratio (%) |
| Example 2-1 | CoSnC-containing material | Coating | Polyvinyl chloride | Coating + heat treatment | 7.99 | 99.2 | 82.8 |
| Example 2-2 | CoSnC-containing material | Coating | Polyvinyl alcohol | Coating + heat treatment | 7.83 | 99.1 | 82.4 |
| Example 2-3 | CoSnC-containing material | Coating | Cyclooctatetaene | Charge and discharge | 8.54 | 99.3 | 84.8 |
| Example 2-4 | CoSnC-containing material | Coating | Poly [bis (benzylthio) acetylene] | Charge and discharge | 8.25 | 99.2 | 83.9 |
| Comparative example 2 | CoSnC-containing material | Coating | — | | 4.59 | 98.1 | 58.1 |

As shown in Table 3, according to Examples 2-1 to 2-4, as in Examples 1-1 to 1-4, compared to Comparative examc1ple 2 in which the coating was not formed, higher values could be obtained for all the discharge capacity, the charge and discharge efficiency, and the capacity retention ratio. That is, it was found that even if other anode active material was used, as long as the coating 13 containing at least one from the group consisting of oligomers having a polyene structure and derivatives thereof is provided, characteristics could be improved.

The present invention has been described with reference to the embodiment and the examples. However, the present invention is not limited to the embodiment and the examples, and various modifications may be made. For example, in the foregoing embodiment and examples, descriptions have been given of the case using the electrolytic solution as an electrolyte. Further, in the foregoing embodiment, descriptions have been given of the case using the gelatinous electrolyte, in which the electrolytic solution is held in the high molecular weight compound. However, other electrolyte may be used. As other electrolyte, for example, an inorganic solid electrolyte using an ion conductive inorganic compound such as ion conductive ceramics, ion conductive glass, and ionic crystal; a mixture of an inorganic solid electrolyte and an electrolytic solution; a mixture of an inorganic solid electrolyte and a gelatinous electrolyte, or an organic solid electrolyte, in which an electrolyte salt is dispersed in an ion conductive organic high molecular weight compound can be cited.

Further, in the foregoing embodiment and examples, descriptions have been given of the battery using lithium as an electrode reactant. However, the present invention can be also applied to the case that other alkali metal such as sodium and potassium (K), an alkali earth metal such as magnesium and calcium (Ca), or other light metal such as aluminum is used. Then, for the anode, for example, the anode active material described in the foregoing embodiment can be used.

Further, descriptions have been given with reference to the cylindrical-type secondary battery and the secondary battery using the package member such as a laminated film in the foregoing embodiment, or the coin-type secondary battery in examples. However, the present invention can be similarly applied to a secondary battery such as a button-type secondary battery, and a square-type secondary battery, or a secondary battery having other structure such as a laminated structure. Further, the present invention can be applied not only to the secondary batteries, but also to other batteries such as primary batteries similarly.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An anode comprising an anode active material layer and a coating layer, the coating layer containing at least one compound selected from the group consisting of an oligomer having a polyene structure and derivatives thereof,
wherein the coating layer is in contact with a surface of the anode active material layer,
wherein the anode active material layer comprises an anode active material selected from the group consisting of: silicon; a compound of silicon containing oxygen or carbon; a silicon alloy that consists of silicon and at least one element selected from the group consisting of tin, nickel, copper, iron, cobalt, manganese, zinc, indium, silver, titanium, germanium, bismuth, antimony and chromium; tin; a compound of tin containing oxygen or carbon; and a tin alloy that consists of tin and at least one element selected from the group consisting of silicon, nickel, copper, iron, cobalt, manganese, zinc, indium, silver, titanium, germanium, bismuth, antimony and chromium, and
wherein the oligomer is derived from heat treatment of at least one of polyvinyl chloride, polyvinyl alcohol, cyclooctatetaene, and poly [bis(benzylthio)acetylene].

2. A battery comprising:
a cathode;
an anode; and
an electrolyte,
wherein the anode has an anode active material layer and a coating layer, the coating layer containing at least one compound selected from the group consisting of an oligomer having a polyene structure and derivatives thereof,
wherein the coating layer is in contact with a surface of the anode active material layer,
wherein the anode active material layer comprises an anode active material selected from the group consisting of: silicon; a compound of silicon containing oxygen or carbon; a silicon alloy that consists of silicon and at least one element selected from the group consisting of tin, nickel, copper, iron, cobalt, manganese, zinc, indium, silver, titanium, germanium, bismuth, antimony and chromium; tin; a compound of tin containing oxygen or carbon; and a tin alloy that consists of tin and at least one element selected from the group consisting of silicon, nickel, copper, iron, cobalt, manganese, zinc, indium, silver, titanium, germanium, bismuth, antimony and chromium, and
wherein the oligomer is derived from heat treatment of at least one of polyvinyl chloride, polyvinyl alcohol, cyclooctatetaene, and poly [bis(benzylthio)acetylene].

3. A battery according to claim 2, wherein the cathode contains a lithium-containing complex oxide.

4. An anode according to claim 1, wherein the anode active material is silicon.

5. An anode according to claim 1, wherein the anode active material layer further comprises at least one of a binder and a thickener.

6. An anode according to claim 1, wherein a thickness of the coating layer is 100 nm or less.

7. A battery according to claim 2, wherein the battery is a lithium ion secondary battery.

8. A battery according to claim 2, wherein the anode active material is silicon.

9. A battery according to claim 2, wherein the anode active material layer further comprises at least one of a binder and a thickener.

10. A battery according to claim 2, wherein a thickness of the coating layer is 100 nm or less.

11. An anode according to claim 1, wherein the coating layer is located between the anode active material layer and a separator.

12. A battery according to claim 2, wherein the coating layer is located between the anode active material layer and a separator.

13. An anode according to claim 1, wherein the coating layer consists essentially of the at least one compound selected from the group consisting of an oligomer having a polyene structure and derivatives thereof.

14. A battery according to claim 2, wherein the coating layer consists essentially of the at least one compound selected from the group consisting of an oligomer having a polyene structure and derivatives thereof.

15. An anode according to claim 1, wherein the anode active material is a CoSnC material containing cobalt, tin and carbon.

16. A battery according to claim 2, wherein the anode active material is a CoSnC material containing cobalt, tin and carbon.

17. An anode according to claim 1, wherein the coating material contains peak ions selected from the group consisting of: $C_3H_5^+$, $C_3H_7^+$, $C_4H_7^+$, $C_4H_9^+$, $C_5H_9^+$, $C_5H_{11}^+$, $C_6H_5^+$, $C_6H_{11}^+$, $C_7H_7^+$, $C_7H_{11}^+$, $C_8H_9^+$, and $C_8H_{13}^+$ when analyzed by positive ion analysis.

18. A battery according to claim 2, wherein the coating material contains peak ions selected from the group consisting of: $C_3H_5^+$, $C_3H_7^+$, $C_4H_7^+$, $C_4H_9^+$, $C_5H_9^+$, $C_5H_{11}^+$, $C_6H_5^+$, $C_6H_{11}^+$, $C_7H_7^+$, $C_7H_{11}^+$, $C_8H_9^+$, and $C_8H_{13}^+$ when analyzed by positive ion analysis.

* * * * *